April 13, 1948. R. S. MILLER 2,439,522
CHAIN AND METHOD OF MAKING THE SAME
Filed Nov. 22, 1941
Fig. 1
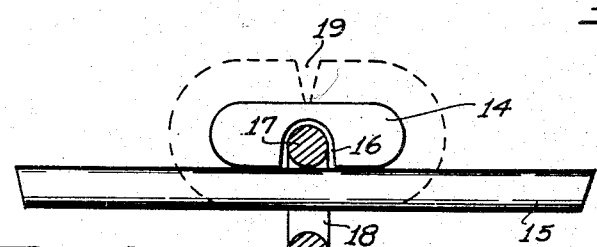
Fig. 2
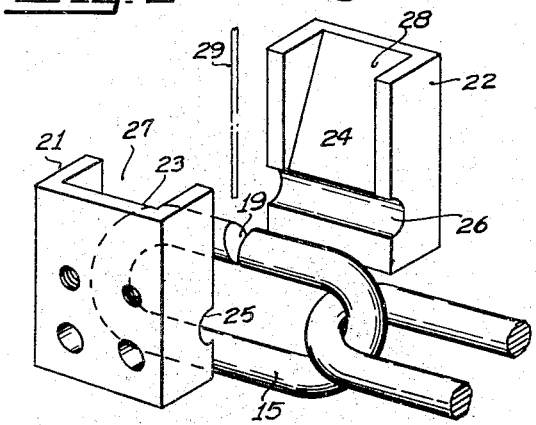
Fig. 3
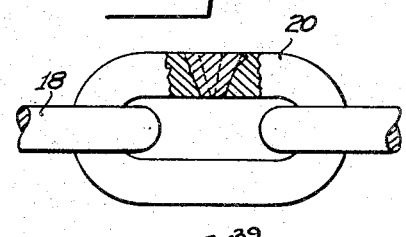
Fig. 4
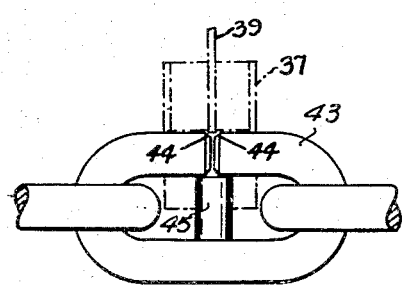
Fig. 7
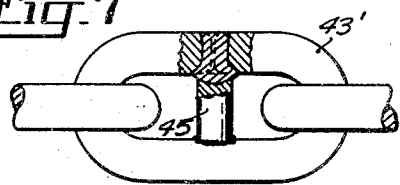
Fig. 5
Fig. 8
Fig. 6
Fig. 9
ROBERT S. MILLER
INVENTOR
BY
ATTORNEY Patented Apr. 13, 1948

2,439,522

UNITED STATES PATENT OFFICE 2,439,522

CHAIN AND METHOD OF MAKING THE SAME

Robert S. Miller, Portland, Oreg., assignor to Pacific Chain and Manufacturing Company, Portland, Oreg., a corporation of Oregon Application November 22, 1941, Serial No. 420,090

16 Claims. (Cl. 59—35)

1

The present invention relates to chain manufacture, and more particularly to chain link structures and methods of producing the same.

Chain links are commonly made from short lengths of round bar stock which are bent to the desired shape and the ends thereof secured together as by resistance welding or by fire welding. It is well known, however, that the fire welding process can be employed only upon low carbon steel, and to compensate for the low tensile strength of the material it is necessary to employ bar stock of relatively large cross sectional area to produce links of the required strength. The process of welding known as resistance welding is not limited to types of steel, but is not practicable for application to bar stock of greater diameter than one inch, because of the low resistance path through the solid side of the link as compared with the gap resistance. For this reason, resistance welding is not used for the production of chain links for heavy duty chains. Heretofore, where high tensile steels are used which do not lend themselves to fire welding, links for heavy duty chains have usually been made either by casting methods or by drop-forging the links in sections, which sections are subsequently riveted or otherwise secured together after the consecutive links are interlinked with one another. Such manufacturing procedures tend toward high cost for the finished product. Where relatively low tensile strength steel is used, heavy duty chains require very heavy link units, such as may be produced by the fire weld process. While excessive weight may not be a serious disadvantage in certain applications, in others it is important that it be avoided or be kept to a minimum. In the case of ship anchor chains, for example, excessive dead weight of the chain means a corresponding reduction in the available load capacity of the vessel. It is desirable, therefore, to produce a heavy duty chain in which each link possesses a maximum tensile strength per unit of cross section or weight. Applicant has discovered that such a chain may be made from short lengths of round metal bar stock of high tensile strength steel formed into a proper shape for the links, and the ends of the bar sections forming each link welded together by a suitable technique wherein a pool of molten metal is formed between the adjacent ends of the bar homogeneously uniting the ends substantially throughout the cross section thereof.

It is an object of the present invention, therefore, to provide as an article of commerce a new and improved chain link formed from round bar steel; and to provide a method of producing the same.

It is a further object of the present invention to provide a new and improved method of welding together the ends of round bar sections which have been preformed into interlinked chain links for producing chain.

It is a further object of the present invention to provide a new and improved method of making chain consisting of round bar steel.

It is a further object of the present invention to provide a new and improved heavy duty chain consisting of round bar, high tensile strength steel, each link having a high tensile strength per unit of cross sectional area and hence being relatively light in weight as compared with the strength of the chain as a whole.

In accordance with an illustrated embodiment of the invention, predetermined lengths of round steel bars are provided at their ends with diagonal cuts, or cuts at an angle differing slightly from right angles, the cuts on opposite ends of each bar being in opposite directions. Thereupon the bars are heated to facilitate bending thereof and the opposite ends of each bar section are doubled back toward each other into the shape of a link so that the oppositely sloping ends define a V therebetween. A mold is provided around the adjacent ends of a bar section thus formed, defining a space between the adjacent bar ends having a cross section substantially equal to the cross section of the bar. A quantity of molten weld metal is then formed in the space between the adjacent bar ends homogeneously uniting the ends substantially throughout the cross section thereof, the weld metal being retained within the space by the surrounding mold and given a shape thereby conforming generally to the shape of the bar. After the molten weld metal has set, the mold may be removed.

Other objects and advantages of the invention will occur to those skilled in the art from a perusal of the following description taken in connection with the accompanying drawing, while the invention itself will be pointed out with greater particularity in the appended claims.

In the drawings, Figure 1 represents a length of bar steel and illustrates the manner in which predetermined lengths thereof may be severed therefrom for making chain links according to the method of the present invention; Figure 2 is a side elevation of one bar section indicating the manner in which it is formed into a chain link; Figure 3 is an exploded view in perspective illustrating the manner in which a mold may be provided around adjacent ends of a link for facilitating the formation of a solid weld therebetween; Figure 4 is a view partly in section of a chain link constructed in accordance with the steps illustrated in Figure 3; Figure 5 is an elevation illustrating a method for making chain links in accordance with a modification of the invention; Figure 6 is an elevation partially in section illustrating a chain link constructed in accordance with the method illustrated in Figure 5; Figure 7 is an elevation illustrating a method for making chain links in accordance with a further modification of the invention; Figure 8 is an elevation of a chain link constructed in accordance with the method illustrated in Figure 7; and Figure 9 is a sectional detail taken on the line 9—9 of Figure 5, illustrating the manner of reinforcement of the link across the welded joint.

The invention is particularly applicable for the manufacture of heavy duty chain, such as anchor chain, from high tensile strength steel, wherein each link possesses a maximum tensile strength proportional to the cross sectional area thereof. It is not intended, however, to limit the application of the invention to any particular size of bar stock or type of steel, as obviously the method herein disclosed may be employed in the manufacture of chain of all sizes and for all purposes. Steel is readily obtainable in standard shapes including round bar, a portion of a length of round bar steel being indicated at 10 in Figure 1. The bar 10 may be severed into sections suitable for bending into chain links by cutting diagonally thereof, at an angle differing slightly from 90 degrees, in opposite directions as indicated at 11 and 12 at predetermined intervals along the length of the bar.

In the practice of the method of the invention each length of bar 10 is heated to facilitate bending the bar in a forming machine. The optimum degree of heat differs according to the size and type of steel used, but it should be remembered that overheating of the bar should be avoided. Bars heated to a red heat are easily bent to the desired shape in a forming machine.

As illustrated in Figure 2, the bar sections may be formed into chain links around a mandrel indicated at 14, the outer dimensions of which correspond to the inner dimensions for the chain link. Since ordinarily each chain link is formed in an interlinking relation with a next adjacent link, one surface of the mandrel 14 is provided with a notch 16 for cooperatively receiving one side 17 of a previously formed link 18 so that the bar section 15, when placed against the one side of the mandrel 14, extends through the opening of the link 18. The opposite ends of the bar section 15 are doubled back over opposite ends of the mandrel 14 toward each other and through an angle substantially equal to 180°. The length of the bar section 15 is such that the opposite ends thereof substantially meet on the surface of the mandrel, the bar being bent in such a direction that the oppositely sloping ends thereof define a V, indicated at 19, the V preferably facing away from the mid portion of the bar section and away from the opposite side of the link.

The V 19 between the adjacent ends of the bar section 15 forming the link is then filled with a quantity of molten weld metal formed therein so as homogeneously to unit the bar ends and complete the link unit. In this step of the process all of the weld metal is in a molten state and all gases and impurities are freed therefrom. Moreover, as indicated in the drawings, the weld metal coalesces with the metal of the bar section, and the joint becomes a homogeneous part of the link. However, unless provision is made to retain the molten metal within the area between the adjacent bar ends, the pool of metal will tend to flow from the bottom of the V or out of the opposite sides thereof. For this reason a mold is provided enclosing the adjacent bar ends and defining the space therebetween for confining the molten metal. While any other suitable form of mold may be provided, it is preferred to use a pair of complementary mold blocks such as are more fully described in Letters Patent No. 2,248,087, granted May 2, 1944, to me for Welding apparatus, and which may readily be assembled about the link. The complementary mold blocks, shown at 21 and 22, have a pair of facing matching surfaces 23 and 24 which are provided with horizontally extending recesses 25 and 26. These recesses cooperate to define a transverse passage through the mold having a cross sectional dimension substantially equal to that of the bar from which the link is formed so that when the blocks are moved into an engaging relation of their faces 23 and 24 the link ends are substantially enclosed with a pocket or space being defined therebetween. Recesses 27 and 28 extending upwardly from the recesses 25 and 26 also are provided in the mold block faces so that a welding rod, as indicated at 29, may be introduced into the region of the link ends for forming the requisite quantity of molten weld metal therebetween. Any suitable welding process may be used, such as electric arc welding, in which event a quantity of welding flux may be placed in the passage formed by recesses 27 and 28 about the weld rod 29 for further enhancing the quality of the finished weld.

Upon the completion of the weld between the bar ends, the mold may be removed and a completed link is left as shown in Figure 4. By virtue of the cooperative relation of the mold blocks with respect to the link ends, the weld will be substantially smooth along the opposite sides and bottom thereof. Thus no grinding away of excess metal is required at these points of relative inaccessibility, while the excess weld metal, if any is formed, is concentrated at a point on the outermost surface of the link, from which it may readily be removed with any suitable grinding apparatus.

In Figures 5 and 6 is illustrated a modification of the invention as applied to the manufacture of a stud type chain link, that is, a link having a transverse stud bridging the link opening. The link in this case comprises an outer section 35, which is similar in all respects to the chain link as previously described, and a stud section 36 centrally arranged and extending transversely of the link opening. The stud section 36 comprises a short piece of bar stock of a length corresponding to the distance between the opposite sides of the link. In accordance with this modification of the invention, the two link ends and the adjacent stud end are all welded together simultaneously. For this purpose the faces of the complementary mold blocks, only one being shown at 37, are provided with an additional vertically extending recess between the lower end of the mold and the transverse recess 25—26 for cooperatively receiving the upper end of the stud portion 36. The lower portion of the mold sections 37 fit relatively closely around the upper end of the stud section 36 so as to hold the stud section securely in proper relation to the link ends, and also so as to prevent the escape of weld metal between the sides of the stud and the mold walls. As previously described, a welding rod as indicated at 39 may be inserted downwardly through the opening in the upper surface of the mold blocks into the region between the link ends. A suitable quantity of loose welding flux material may also be introduced into the hopper formed by the upper portions of the mold sections, and the pool of molten metal or weld then formed. The weld thus formed, and as illustrated in cross section at 41 in Figure 6, not only fuses and homogeneously unites the opposite ends of the bar forming the outer link section, but also extends downwardly into the upper end of the stud portion 36 whereby the upper end of the latter is integrally united with the adjacent side of the outer link section. Moreover, the welded joint between the ends of the bar section is reinforced across the joint by reason of the fact that the end of the stud 36 is welded to both arms of the link. This reinforcement of the joint between the arms of the link is shown in the sectional detail illustrated in Figure 9. The dotted lines in the figure indicate the ends of the arms of the link and the end of the stud 36, respectively, in position preparatory to welding. The opposite end of the stud portion 36 may be welded to the adjacent side of the link as indicated at 42.

The method illustrated in Figure 7 involves the forming of a link 43 by bending a bar section around a mandrel in the manner illustrated in Figure 2. Each end of the bar section is provided with a bevel 44, and upon bringing the ends of the bar section into end to end relation, the contiguous bevels 44 together form a V extending continuously around the surface of the abutting arms. Thereupon, a stud portion 45 is inserted in the link in bridging relation between the opposite sides thereof and is so positioned that one end of the stud 45 underlies the aligned ends of the bar section. Thereupon the assembly is placed in a mold in a manner similar to that described in connection with the embodiment illustrated in Figures 5 and 6, and a quantity of weld metal is deposited in said V between said adjacent bar ends, as well as in the space between said bar ends and said stud, homogeneously uniting the ends of said bar section and the adjacent end of said stud section. The advantage of this construction, heretofore not found in stud type chain links, is that not only are the bar ends homogeneously united to form a closed link structure, but the side of the link across the joint is reinforced by coalescence of the weld metal with the parent metal of each end of the bar section as well as with the metal of the stud section.

Having now described my invention and in what manner the same may be used, what I claim as new and desire to protect by Letters Patent is:

1. The method of making a chain link which comprises providing oppositely sloping surfaces on the ends of a substantially straight section of round bar steel, heating said bar to a degree to facilitate bending thereof, doubling back the opposite ends of said section toward each other and in a spaced relation with respect to the mid portion of said section in a manner to cause the sloping ends of said section to form a V therebetween, placing a mold around the adjacent ends of said section for confining a space therebetween corresponding in cross section substantially equal to the cross section of said bar section, introducing a metal electrode into said space so as to draw an arc and melt said electrode, and filling said space with said molten weld metal for homogeneously uniting said adjacent ends of said bar.

2. The method of making a chain link which comprises bending the ends of a substantially straight section of round bar stock through substantially 180° toward each other and in a spaced relation with respect to the intermediate portion of said section, providing a mold around the adjacent ends fitting closely thereabout for confining a space between said ends having a cross section substantially equal to the cross section of said bar, introducing weld metal into said space and drawing an electric arc between said metal and the bar stock for melting said weld metal, filling said space with said molten weld metal for fusing and homogeneously uniting said ends and subsequently removing said mold.

3. The method of making a chain link which comprises doubling back the ends of a bar section toward each other, placing a mold in closely fitting relation around the bar portions adjacent said ends for confining a space therebetween having a cross section substantially equal to the cross section of said bar, melting a quantity of non-parent weld metal within said mold between said adjacent bar ends filling said space therebetween for fusing and homogeneously uniting said bar ends, and subsequently removing said mold.

4. The method of making a chain link which comprises doubling back the ends of a bar section toward each other, placing a mold in a closely fitting relation around the bar portions adjacent said ends in a manner for confining a space between said bar ends substantially equal in cross section to the cross section of said bar, placing a quantity of welding flux material into said space, melting a quantity of non-parent weld metal within said space between said adjacent bar ends whereby said flux is melted substantially sealing the space between said mold and said bar ends, said weld metal fusing and homogeneously uniting said bar ends, and subsequently removing said mold.

5. The method of making a chain link which comprises doubling back the ends of a bar section toward each other, providing a mold around the end portions of said bar closely fitting thereabout and forming a pocket open at the top and extending between said bar ends, introducing a quantity of non-parent weld metal into said pocket and thereupon melting said weld metal so as to form a quantity of molten weld metal in said pocket for fusing with and homogeneously uniting said bar ends.

6. The method of making a chain link which comprises providing oppositely sloping ends on a substantially straight section of round bar steel, doubling back the opposite ends of said section toward each other in a spaced relation with respect to the intermediate portion of said bar section, placing a stud bar section transversely of the opening of the link thus formed with one end of said stud section arranged centrally beneath the adjacent ends of said bar section, placing a mold around said adjacent bar ends including the end of said stud section, melting a quantity of weld metal therein for homogeneously uniting the ends of said bar section and the adjacent end of said stud section, and thereafter removing said mold.

7. The method of making a chain link which comprises bending the ends of a section of round bar stock through substantially 180° toward each other in a spaced relation with respect to the intermediate section of said bar, arranging a stud bar section transversely of the opening of the link thus formed, melting a quantity of non-parent weld metal in situ between the adjacent ends of said bar stock and said stud and homogeneously uniting said stud sections and said bar stock substantially throughout the full cross section thereof by coalescence of all the said metals.

8. The method of making chain links which comprises cutting lengths of bar stock at an angle differing slightly from a right angle in opposite directions at opposite ends of said lengths, heating said lengths of bar stock to a degree to facilitate bending thereof, bending the opposite ends of each of said bar lengths through substantially 180° and in a spaced relation with respect to the mid portion thereof, causing the end surfaces of said bar to slope outwardly forming a V-shaped space therebetween, introducing non-parent weld metal into said space and melting said weld metal in situ to form a pool of molten weld metal corresponding in cross section substantially to the cross section of said bar for integrally uniting the adjacent ends of said bar.

9. The method of making a chain link which comprises providing oppositely sloping ends on a section of a substantially straight round bar of steel, heating said bar to facilitate bending thereof, doubling back the opposite ends of said bar section toward each other in a spaced relation from the mid portion of said section in a manner to cause the sloping ends of said bar to form a V therebetween, introducing non-parent weld metal into said V and melting said weld metal in situ to form a pool of molten weld metal integrally uniting the adjacent ends of said bar.

10. As a new article of manufacture, an anchor chain link comprising a section of high tensile strength bar steel having oppositely sloping ends, said ends being doubled back toward each other defining a V therebetween, and means comprising a molded deposit of non-parent weld metal corresponding in cross section substantially to the cross section of said bar fused homogeneously with and uniting said ends of said bar sections.

11. As a new article of manufacture, a chain link comprising a section of round bar steel having ends doubled back toward each other in a spaced relation with respect to the mid section of said bar, and means comprising a molded deposit of non-parent weld metal corresponding in cross section substantially to the cross section of said bar fused homogeneously with and uniting said ends of said bar sections.

12. As a new article of manufacture, a chain link comprising a section of bar steel having ends doubled back toward each other in an aligned relation and spaced from the intermediate portion of said bar section, and means comprising a molded deposit of non-parent weld metal corresponding in cross section substantially to the cross section of said bar fused homogeneously with and uniting said ends of said bar section substantially throughout the cross section of said bar ends.

13. As a new article of manufacture, a chain link comprising a section of bar steel having ends doubled back toward each other and spaced from the intermediate portion of said bar section, and a molded deposit of non-parent weld metal between said ends fused with and homogeneously uniting said bar ends corresponding in cross section substantially to the cross section of said bar.

14. As a new article of manufacture, an anchor chain link comprising a section of high tensile strength bar steel having opposite ends bent back toward and in substantial alignment with each other, said ends being homogeneously united by a molded deposit of non-parent weld metal corresponding in cross section substantially to the cross section of said bar.

15. A chain link comprising a section of bar steel having opposite ends bent back toward and in substantial alignment with each other, said ends being homogeneously united by a molded deposit of non-parent weld metal provided therebetween and corresponding in cross section substantially to the cross section of said bar, and a stud section of bar steel bridging the space between said ends and the opposite side of said link, one end of said stud section being homogeneously united by said molded deposit of weld metal to both of said first mentioned ends.

16. A chain link comprising a section of high tensile strength bar steel having opposite ends bent back toward each other and in substantial alignment with each other, a stud bar section arranged between said ends and the opposite side of said link, and a molded deposit of non-parent weld metal corresponding in cross section substantially to the cross section of said bar homogeneously uniting said aligned bar ends and the adjacent end of said stud section.

ROBERT S. MILLER.

REFERENCES CITED

The following references are of record in the file of this patent:

UNITED STATES PATENTS

| Number | Name | Date |
| --- | --- | --- |
| 778,269 | Rietzel | Dec. 27, 1904 |
| 914,946 | Haldy | Mar. 27, 1904 |
| 1,161,003 | Merritt | Nov. 16, 1915 |
| 1,161,004 | Merritt | Nov. 16, 1915 |
| 1,256,117 | Duncan | Feb. 12, 1918 |
| 1,256,118 | Duncan | Feb. 12, 1918 |
| 1,549,461 | Deppeler | Aug. 11, 1925 |
| 2,260,630 | McKinnon et al. | Oct. 28, 1941 |
| 2,279,044 | Heist | Apr. 7, 1942 |
| 2,304,938 | Lutts et al. | Dec. 15, 1942 |

FOREIGN PATENTS

| Number | Country | Date |
| --- | --- | --- |
| 697,125 | France | Oct. 21, 1930 |
| 831,041 | France | May 30, 1938 |
| 835,479 | France | Sept. 26, 1938 |